United States Patent
Mohan et al.

(10) Patent No.: US 8,144,644 B1
(45) Date of Patent: Mar. 27, 2012

(54) NETWORK-SIDE SETUP OF A PACKET-DATA COMMUNICATION SESSION ON BEHALF OF A MOBILE STATION, FOLLOWED BY TRANSFER OF THE COMMUNICATION SESSION TO THE MOBILE STATION

(75) Inventors: David Mohan, Overland Park, KS (US); Tong Zhou, Overland Park, KS (US); Timothy W. Sill, Platte City, MI (US)

(73) Assignee: Sprint Spectrum L.P., Overland Park, KS (US)

( * ) Notice: Subject to any disclaimer, the term of this patent is extended or adjusted under 35 U.S.C. 154(b) by 856 days.

(21) Appl. No.: 11/348,644

(22) Filed: Feb. 7, 2006

(51) Int. Cl.
*H04W 4/00* (2009.01)

(52) U.S. Cl. ........ 370/328; 370/331; 370/321; 370/352; 455/554.1; 455/560

(58) Field of Classification Search .................. 370/328, 370/331, 352, 465; 455/554.1, 560
See application file for complete search history.

(56) References Cited

U.S. PATENT DOCUMENTS

| | | | |
|---|---|---|---|
| 5,838,766 | A | 11/1998 | Rand |
| 6,064,653 | A | 5/2000 | Farris |
| 6,185,300 | B1 | 2/2001 | Romesburg |
| 6,421,324 | B1 | 7/2002 | Boyle et al. |
| 6,449,497 | B1 | 9/2002 | Kirbas et al. |
| 6,668,049 | B1 | 12/2003 | Koch et al. |
| 6,741,695 | B1 | 5/2004 | McConnell et al. |
| 6,771,639 | B1 | 8/2004 | Holden |
| 6,920,455 | B1 | 7/2005 | Weschler |
| 6,996,087 | B2 | 2/2006 | Ejzak |
| 7,023,825 | B1 | 4/2006 | Haumont et al. |
| 7,043,266 | B2 | 5/2006 | Chaturvedi et al. |
| 7,167,447 | B2 | 1/2007 | Puuskari et al. |
| 7,200,139 | B1 | 4/2007 | Chu et al. |
| 7,289,493 | B1 | 10/2007 | Vera |
| 7,289,522 | B2 | 10/2007 | Gallant |
| 7,313,227 | B2 | 12/2007 | Jones |
| 2001/0016492 | A1 | 8/2001 | Igarashi et al. |
| 2002/0034166 | A1 | 3/2002 | Barany et al. |
| 2002/0159440 | A1 | 10/2002 | Mussman et al. |
| 2002/0167946 | A1 | 11/2002 | Gallant |
| 2003/0012177 | A1 | 1/2003 | Vassilovski |

(Continued)

OTHER PUBLICATIONS

RFC-2327 SDP: Session Description protocol, http://www.ietf.org/rfc/rfc2327.txt?number=2327 Network Working Group M. Handley Request for Comments: 2327 V. Jacobson Category: Standards Track ISI/LBNL Apr. 1998.*
Unpublished U.S. Appl. No. 10/616,670, entitled "Method and System for Controlling Sessions from a Subscriber Terminal," filed Jul. 10, 2003 in the name of Manish Mangal.
Handley and Jacobson, "SDP: Session Description Protocol," Network Working Group, Apr. 1998.

(Continued)

*Primary Examiner* — Nimesh Patel

(57) ABSTRACT

Methods and systems are provided for network-side setup of a packet-data communication session on behalf of a mobile station, followed by transfer of the communication session to the mobile station. A radio access network (RAN) receives from the mobile station an origination message comprising a code and a called-party identifier, the code indicating that the mobile station is requesting that, on behalf of the mobile station, the RAN set up a packet-based communication session between the mobile station and an endpoint associated with the identifier. Responsive to the origination message and on behalf of the mobile station, the RAN sends to the endpoint an invitation to participate in the communication session. Responsive to the endpoint accepting the invitation, the RAN sends to the mobile station information enabling the mobile station to engage in messaging with the endpoint related to the communication session and/or participate in the communication session with the endpoint.

19 Claims, 5 Drawing Sheets

U.S. PATENT DOCUMENTS

| | | | |
|---|---|---|---|
| 2003/0043803 A1 | 3/2003 | Hooper | |
| 2003/0063623 A1 | 4/2003 | Leslie et al. | |
| 2003/0091026 A1 | 5/2003 | Penfield et al. | |
| 2003/0193961 A1 | 10/2003 | Moore et al. | |
| 2004/0042600 A1 | 3/2004 | Tripathi et al. | |
| 2004/0072593 A1* | 4/2004 | Robbins et al. | 455/560 |
| 2004/0095923 A1 | 5/2004 | Ejzak et al. | |
| 2004/0095925 A1 | 5/2004 | Cody et al. | |
| 2004/0141514 A1 | 7/2004 | Delaney et al. | |
| 2004/0196826 A1* | 10/2004 | Bao et al. | 370/352 |
| 2004/0228324 A1 | 11/2004 | Alexiou et al. | |
| 2004/0233892 A1 | 11/2004 | Roberts et al. | |
| 2005/0088966 A9 | 4/2005 | Stewart | |
| 2006/0077932 A1* | 4/2006 | Takeda et al. | 370/331 |
| 2008/0013531 A1 | 1/2008 | Elliott et al. | |

OTHER PUBLICATIONS

Non-final Office Action from U.S. Appl. No. 10/616,670, mailed Feb. 17, 2009.

Advisory Action from U.S. Appl. No. 10/616,670, mailed Nov. 25, 2008.

Final Office Action from U.S. Appl. No. 10/616,670, mailed Sep. 4, 2008.

Non-final Office Action from U.S. Appl. No. 10/616,670, mailed Feb. 20, 2008.

Non-final Office Action from U.S. Appl. No. 10/616,670, mailed Jul. 26, 2007.

Final Office Action from U.S. Appl. No. 10/616,670, mailed Aug. 19, 2009.

\* cited by examiner

```
CONNECT SIP/2.0
TO: [ENDPOINT_110_SIP_ADDRESS] [ENDPOINT_110_IP_ADDRESS]
FROM: [MOBILE_STATION_102_SIP_ADDRESS]
CONTENT-TYPE: APPLICATION/SDP
CALL-ID: [CALL_IDENTIFIER]
CONTENT-LENGTH: [NUMBER_OF_BYTES]
APP-ID: [APPLICATION_IDENTIFIER]
X-TO: ["TO:" PARAMETER USED BY RAN SIP CLIENT]
X-FROM: ["FROM:" PARAMETER USED BY RAN SIP CLIENT]
[SDP_PARAMETERS]
```

FIG. 4

NETWORK-SIDE SETUP OF A PACKET-DATA COMMUNICATION SESSION ON BEHALF OF A MOBILE STATION, FOLLOWED BY TRANSFER OF THE COMMUNICATION SESSION TO THE MOBILE STATION

BACKGROUND

1. Technical Field

The present invention relates to packet-data communication and, more particularly, to improving the initiation of packet-data communication sessions involving mobile stations.

2. Description of Related Art

More people than ever are using mobile stations, such as cellular telephones and personal digital assistants (PDAs), to connect to radio access networks (RANs), which are also referred to as wireless networks, wireless wide area networks (WWANs), wireless communication systems, cellular communication systems, wireless access networks, and by other names. Service providers typically operate RANs to provide both voice and data services using a wireless communication format such as Code Division Multiple Access (CDMA), or another format. Relevant aspects of CDMA are described in the known industry standards IS-95 and IS-2000, which are incorporated herein by reference.

As mentioned above, mobile stations connect to RANs to engage in both voice and packet-data communication sessions. These packet-data communication sessions may take the form of, as examples, web-browsing sessions, e-mail sessions, instant-messaging sessions, Voice over Internet Protocol (VoIP) sessions, and/or any other type of packet-data communication sessions. To engage in these sessions, mobile stations may use a packet-switched protocol such as the Internet Protocol (IP), relevant aspects of which are described in "Internet Protocol," RFC 791 (September 1981), which is incorporated herein by reference.

Certain types of packet-data communication sessions, such as VoIP sessions, may be set up using a protocol such as the Session Initiation Protocol (SIP), relevant aspects of which are described in Rosenberg et al., "SIP: Session Initiation Protocol," RFC 3261 (June 2002), which is incorporated herein by reference. The SIP messages involved in setting up these packet-data communication sessions may include description of one or more parameters of those sessions according to a protocol known as the Session Description Protocol (SDP). These parameters may include codecs, communication protocols, and/or any other parameters. Relevant aspects of SDP are described in Handley and Jacobson, "SDP: Session Description Protocol," RFC 2327 (April 1998), which is incorporated herein by reference.

Mobile stations implementing SIP may include a functional entity known as a SIP client, which, perhaps via a network entity known as a SIP server or SIP proxy, transmits messages to and receives messages from a SIP client in the device with which the mobile station is attempting to initiate the, for example, VoIP session. The mobile station typically sends these SIP messages to and receives these SIP messages from a SIP server communicatively connected to the RAN. Thus, the SIP messages traverse the air interface between the mobile station and the RAN.

Once the session parameters have been agreed upon by the two devices, the session may be conducted using a bearer protocol such as the Real-time Transport Protocol (RTP), relevant aspects of which are described in Schulzrinne et al., "RTP: A Transport Protocol for Real-Time Applications," RFC 3550 (July 2003), which is incorporated herein by reference. Many other protocols may used instead of or in addition to RTP, however.

Another known example of a VoIP-call-setup sequence involves a packet-based or legacy telephone connected to an IP-telephony gateway, which engages in call-setup signaling, perhaps with another gateway, on behalf of the telephone, using a protocol such as H.323 or SIP. Also, devices known as media (or analog) terminal adapters are known to function as gateways that engage in SIP-based call-setup signaling on behalf of non-SIP devices. Finally, it is known for devices referred to as soft-switches or soft mobile switching centers ("soft MSCs") to engage in SIP-based call-setup signaling on behalf of mobile stations.

SUMMARY

Methods and systems are provided for network-side setup of a packet-data communication session on behalf of a mobile station, followed by transfer of the communication session to the mobile station. In one embodiment, the present invention may take the form of a method. In accordance with the method, a RAN receives from a mobile station an origination message including a code and a called-party identifier. The code indicates that the mobile station is requesting that, on behalf of the mobile station, the RAN set up a packet-based communication session between the mobile station and an endpoint associated with the called-party identifier.

Responsive to receiving the origination message from the mobile station, the RAN, on behalf of the mobile station, sets up the packet-based communication session between the mobile station and the endpoint. This involves (i) sending a first message to the endpoint, the first message including an invitation to the endpoint to participate in the packet-based communication session, and (ii) receiving a second message from the endpoint, the second message including an indication that the endpoint has accepted the invitation.

Responsive to receiving the second message, the RAN sends a third message to the mobile station. The third message includes information enabling the mobile station to engage in at least one of (i) messaging with the endpoint related to the packet-based communication session and (ii) participation in the packet-based communication session with the endpoint.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 4 is a simplified block diagram of a message that may be used in accordance with exemplary embodiments.

DETAILED DESCRIPTION OF EXEMPLARY EMBODIMENTS

1. Overview

Figure 1:
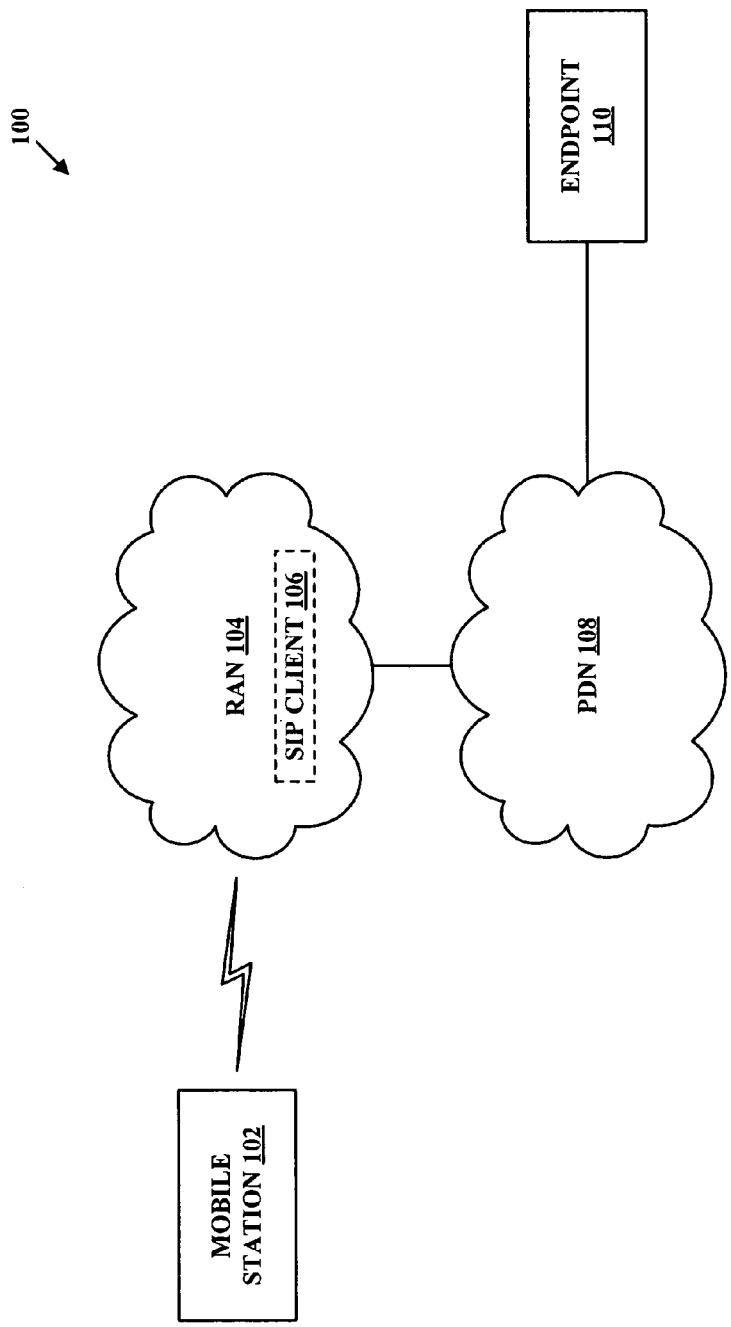
FIG. 1 is a simplified block diagram of a communication system that may be used in accordance with exemplary embodiments.

As presently contemplated, a RAN will include a SIP client to set up packet-data communication sessions—such as VoIP sessions—on behalf of a mobile station. Once the network-side SIP client receives an indication that the endpoint with which the SIP client is setting up the communication session has accepted an invitation to participate, the SIP client transfers information to the mobile station to enable the mobile station to thereafter engage in messaging with the endpoint related to the packet-data communication session and/or participate in the communication session itself.

The messaging related to the communication session may involve further setup of the communication session, maintenance of the communication session, termination of the communication session, teardown of the communication session, and/or any other aspect of the communication session. Participation in the communication itself may involve exchanging packet data with the other endpoint (or endpoints) according to the parameters of the communication session that were arranged by the network-side SIP client.

Thus, according to the principles of the present invention, a mobile station may start by acquiring packet-data connectivity via the RAN. Note that this packet-data connectivity may be independent of any ensuing packet-data communication session in which the mobile station may participate. Thus, the mobile station may engage in a registration process with the RAN, and then send a request to the RAN for packet-data connectivity. The RAN may responsively assign a traffic channel to the mobile station, and then negotiate with the mobile station over that traffic channel to establish a data-link-layer connection, such as a point-to-point protocol (PPP) connection, with the mobile station. The RAN may then assign the mobile station an IP address, and store an association between the IP address and the data-link-layer connection. For the time being, the RAN may also store an association between those values and the particular traffic channel that the RAN assigned to the mobile station.

Following these steps, the RAN may terminate the assignment of the traffic channel to the mobile station, freeing that channel to be available to address more immediate needs. Thus, the mobile station may reach what is known as a "dormant" state, where the mobile station has both an IP address and a data-link-layer connection with the RAN, but no radio resources.

At some later time, a user of the mobile station may wish to participate in a packet-data communication session with some endpoint. For illustration, that packet-data communication session may be a VoIP session, and the user may start this process by typing in the number that the user wishes to call and pressing a "Send" or "Talk" key on a user interface of the mobile station. In response to those actions, the mobile station sends an origination message to the RAN, perhaps via an access channel.

This origination message includes both a code and the called number. The code may be known as a "service option code," and indicates to the RAN that the mobile station is requesting that the RAN, on behalf of the mobile station, set up the VoIP session with whatever endpoint is associated with the called number. For illustration, a packet-based telephone addressable by a SIP address may be associated with that called number, though other endpoint possibilities (such as gateways, computers, etc.) certainly exist.

In response to receiving the origination message, the RAN may invoke a SIP client to set up the VoIP session on behalf of the mobile station. The RAN may also transition the mobile station to an active data state by assigning a traffic channel to the mobile station and associating that traffic channel with the earlier-established IP address and data-link-layer connection. The SIP client may be a functional entity that resides on any computer, server, or other entity in the RAN that has packet-data connectivity with a packet-data network such as the Internet.

The SIP client may then use the called number to access information related to the called endpoint. For example, the SIP client may access a SIP or IP address associated with the called endpoint. The SIP client may also use information such as the calling number (e.g., the mobile station's mobile identification number (MIN)) to authenticate the mobile station and/or determine whether the mobile station is authorized to initiate the VoIP session.

Next, the SIP client may send a SIP INVITE message to, for example, a SIP address identified as associated with the called number. That SIP INVITE message may include the mobile station's SIP address, the called endpoint's SIP address, an IP address to which the called endpoint may reply, an indication that the mobile station is inviting the called endpoint to participate in a VoIP session, as well as one or more proposed parameters for the VoIP session. These proposed parameters may relate to codecs, protocols, and/or any other parameters relevant to setting up the VoIP session. Generally speaking, the RAN-based SIP client fills out the SIP INVITE message as the mobile station itself would. The RAN-based SIP client may transmit this SIP INVITE over a packet-data network, such as the Internet, to the called endpoint.

One parameter that the SIP client may include in the SIP INVITE message is a nonce-response pair exchanged between the mobile station and an entity known as a SIP registrar. Once the mobile station gains packet-data connectivity, it may register with the SIP registrar. To authenticate the mobile station, the SIP registrar may send a value known as a nonce to the mobile station. The mobile station may perform a hash function to compute a response, and then transmit that response to the SIP registrar. The mobile station and the SIP registrar may conduct this exchange periodically and/or in response to events such as the mobile station conducting a re-registration. In any event, the RAN-based SIP client may use the mobile station's MIN to access the mobile station's most recent nonce and response, and may include that pair of values in the SIP INVITE message as well, for authentication purposes.

The called endpoint, upon receipt of the SIP INVITE message, may reply by transmitting a SIP 200 OK message over the packet-data network to the RAN-based SIP client. This SIP 200 OK message may indicate that the called endpoint has accepted the invitation to participate in the VoIP session. The SIP 200 OK message may also indicate acceptance by the called endpoint of some or all of the VoIP-session parameters proposed by the RAN-based SIP client. The SIP 200 OK message may also propose alternative parameters.

Note that one or more SIP proxies may reside on the communication path between the RAN-based SIP client and the called endpoint. In general, SIP proxies are network entities that route messages to SIP entities, in part with reference to one or more SIP registrars.

Upon receipt of the SIP 200 OK from the called endpoint, the RAN-based SIP client has now determined that the called endpoint has, in general, accepted the mobile station's invitation to participate in the VoIP session. In response, the SIP client may take a number of steps. Preferably, the SIP client will first notify the mobile station of the acceptance by transmitting a SIP message—such as a SIP CONNECT message—to the mobile station. Note that standard SIP does not include a CONNECT message; that message is newly defined in connection with the present invention. Essentially, this message transfers information from the SIP client to the mobile station so that the mobile station may thereafter engage in SIP messaging with the called endpoint and/or participate in the VoIP session with the called endpoint. The RAN-based SIP client may also send a SIP ACK message to the called endpoint to complete the session setup.

As explained above, prior to the RAN-based SIP client transmitting this SIP CONNECT message to the mobile station, the mobile station became capable of receiving that message by acquiring a radio traffic channel associated with its already-established IP address and data-link-layer connection. Thus, the RAN-based SIP client may transmit this SIP CONNECT message to the mobile station's IP address, which the SIP client may have already obtained from a suitable database using the mobile station's MIN; the MIN was provided by the mobile station in the origination message that requested the setup of the VoIP session in the first instance.

Note that one or more of the described SIP messages may include one or more headers that are considered standard headers in SIP, and may also include one or more "non-standard" headers. So, for example, the SIP INVITE message described above may have "From:" and "To:" headers that indicate that the SIP INVITE message itself is "from" the RAN-based SIP client and "to" the called endpoint, so that the endpoint's SIP 200 OK message can properly make its way back to the RAN-based SIP client. However, the SIP INVITE message may also include headers with designations such as "x-From:" and "x-To:" that indicate which entities the invitation to participate in the VoIP session are "really" "from" and "to" (i.e., the invitation is "really" "from" the mobile station and "to" the called endpoint).

Thus, once the mobile station has received the SIP CONNECT message from the RAN-based SIP client (and perhaps once the called endpoint has received the SIP ACK message from the RAN-based SIP client), the mobile station (using its own SIP client) and the called endpoint may then exchange SIP messages over a communication path that includes the RAN and the packet-data network. For example, to terminate the session, the mobile station may transmit a SIP BYE message to the called endpoint, which may then reply by transmitting a SIP 200 OK message to the mobile station. Note again that these SIP messages may be addressed to each other's SIP addresses, and may be forwarded by a SIP proxy to their destination.

In addition to being able to exchange SIP messages, the mobile station and the called endpoint may exchange packets as part of the VoIP session. For example, these could be RTP packets that conform to the parameters that were agreed upon by the RAN-based SIP client and the called endpoint, and then transferred from the RAN-based SIP client to the mobile station.

Note that implementing SIP call-setup by the RAN instead of by the mobile station has at least the advantage that the communication-session-setup process may take less time, as the SIP messages related to call setup (such as the INVITE, 200 OK, and ACK messages) do not need to be transmitted between the RAN and the mobile station. As such, users should experience less delay when attempting to initiate packet-data communication sessions, such as VoIP sessions. The actual reduction in delay experienced by users may depend at least in part on the length, complexity, and number of SIP messages that may be necessary in particular cases.

2. Exemplary Architecture a. Exemplary Communication System

FIG. 1 is a simplified block diagram of a communication system that may be used in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes a mobile station 102, a RAN 104 that includes a SIP client 106, a packet-data network (PDN) 108, and an endpoint 110. It should be understood that any number of other entities could be present as well. For example, there could be any number of mobile stations and other devices in communication with RAN 104. Also, there could be any number of routers, other devices, and/or networks making up all or part of any of the communication links, such as the link between RAN 104 and PDN 108.

Mobile station 102 may be any mobile device capable of communicating with one or more RANs, such as RAN 104, and of carrying out the mobile-station functions described herein. As examples, mobile station 102 could be a cellular telephone, PDA, laptop computer, or perhaps a multi-mode device, capable of communicating with RANs and wireless local area networks (WLANs). Mobile station 102 may communicate with RAN 104 over an RF air interface using a protocol such as CDMA. In particular, mobile station 102 may use a protocol known as cdma2000®, described in "CDMA 2000® Series," TIA/EIA/IS-2000 Series, Rev. A (March 2000), which is incorporated herein by reference.

RAN 104 may be any type of RAN capable of communicating (i) over an RF air interface with one or more mobile stations and (ii) with a packet-data network such as PDN 108. RAN 104 may include one or more of the following components, which are known in the art, as are methods of interconnecting them: base transceiver station (BTS), base station controller (BSC), mobile switching center (MSC), packet data serving node (PDSN), circuit-switched network, packet-switched network, and/or any other components necessary to enable voice and packet-data communication with one or more mobile stations, as well as circuit-switched and/or packet-switched communications with one or more other entities or networks. RAN 104 may be connected to PDN 108, the Internet, and/or the Public Switched Telephone Network (PSTN).

Note also that RAN 104 may provide wireless data service to one or more mobile stations using at least one wireless protocol in addition to or instead of CDMA. For example, RAN 104 could provide wireless data service to mobile station 102 using a protocol known as Evolution-Data Only or Evolution-Data Optimized (EvDO). EvDO may also be abbreviated EV-DO, 1xEV-DO, or DO. Other protocols that may be used include Advanced Mobile Phone Service (AMPS), Time Division Multiple Access (TDMA), Frequency Division Multiple Access (FDMA), and Orthogonal Frequency Division Multiple Access (OFDMA), to name a few.

SIP client 106 may be any entity configured to carry out the SIP-client functions described herein. As such, SIP client 106 may comprise any combination of software, hardware, and/or firmware. SIP client 106 may be a functional component of any of the RAN components mentioned herein, or any other component. SIP client 106 may comprise executable code stored on a network server, in a RAN base station, or in a PDSN. And SIP client 106 need not reside on a single network device; its functions may be distributed among more than one network entity.

PDN 108 may include one or more wide area networks, one or more local area networks, one or more public networks such as the Internet, one or more private networks, one or more wired networks, and/or one or more wireless networks. Devices in communication with PDN 108 may use a packet-switched protocol such as IP, and have an address such as an IP address.

Endpoint 110 may be any device arranged to carry out the endpoint functions described herein. As examples, endpoint 110 could be a mobile station, a packet-based telephony device, a cellular telephone, a PDA, a computer, a server, a gateway, a media gateway connected to the PSTN, a push-to-talk server, a conference server, and/or any other type of packet-data-communication endpoint now known or later developed. Such endpoints are known in the art, and thus are not described in detail here. Lastly, endpoint 110 could be a group of recipients.

3. Exemplary Operation a. A First Exemplary Method

Figure 2:
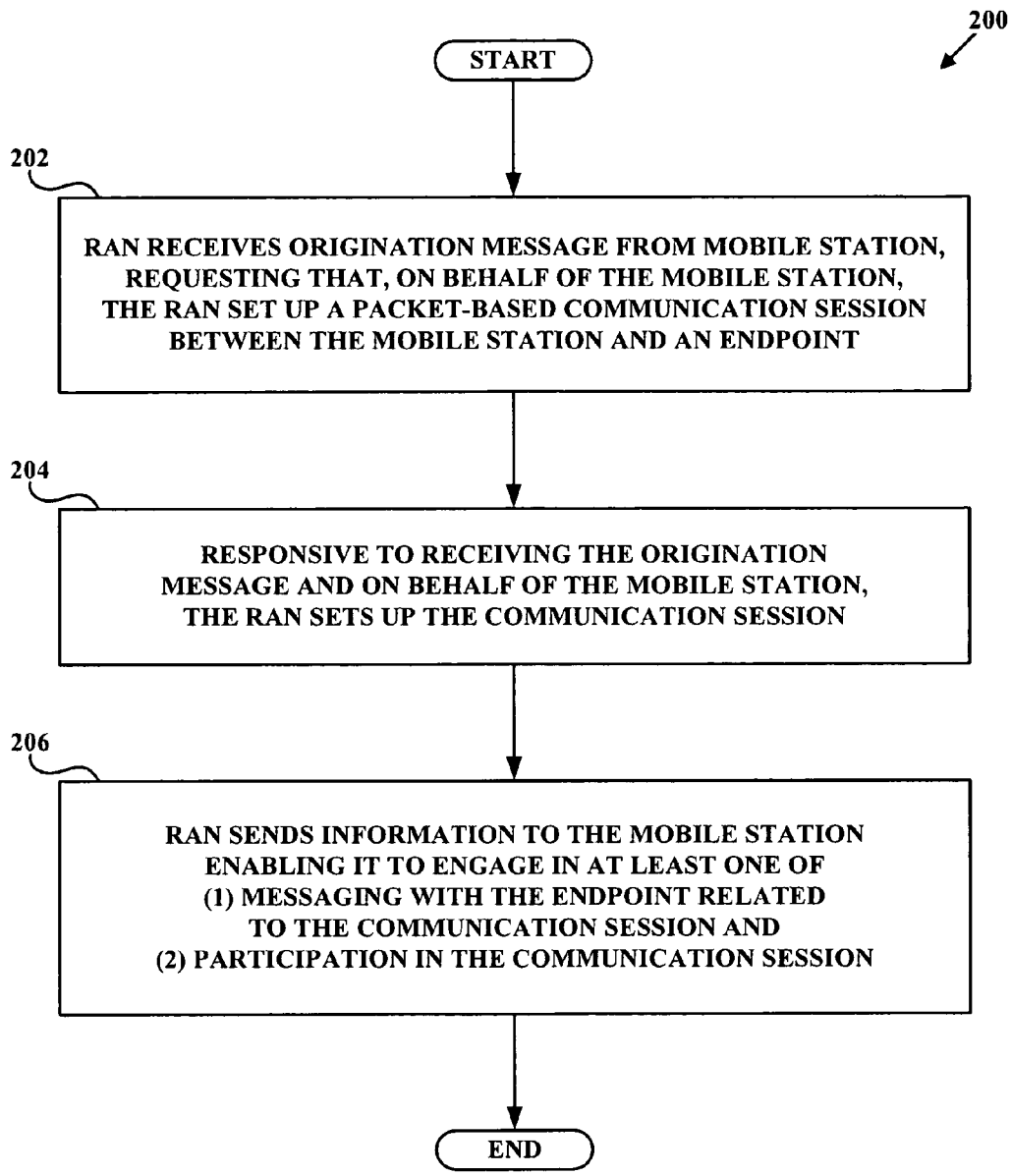
FIG. 2 is a flowchart of a first exemplary method that makes use of the communication system of FIG. 1, in accordance with exemplary embodiments.
Figure 3:
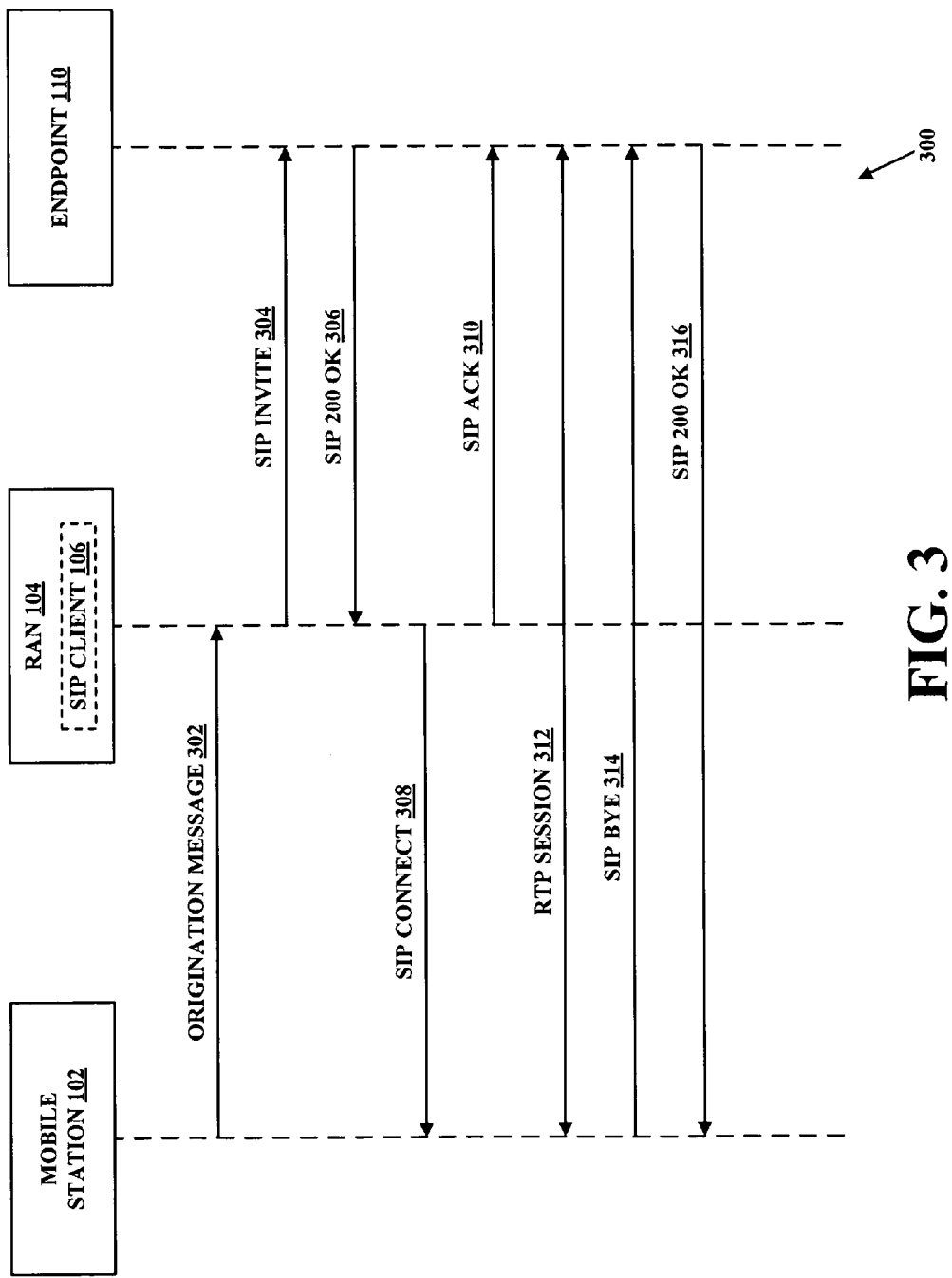
FIG. 3 is a call-flow diagram that includes at least some of the messaging that may occur as the method of FIG. 2 is carried out, in accordance with exemplary embodiments.

Operation of exemplary embodiments of the present invention will now be described with reference to FIGS. 2 and 3. FIG. 2 is a flowchart of a first exemplary method that makes use of the communication system of FIG. 1, in accordance with exemplary embodiments, while FIG. 3 is a call-flow diagram that includes at least some of the messaging that may occur as the method of FIG. 2 is carried out, in accordance with exemplary embodiments.

As shown in FIG. 2, the method 200 begins at step 202, when RAN 104 receives an origination message from mobile station 102. The origination message includes a code and a called-party identifier. The code indicates that mobile station 102 is requesting that, on behalf of mobile station 102, RAN 104 set up a packet-based communication session between mobile station 102 and endpoint 110, which is associated with the called-party identifier.

At step 204, responsive to receiving the origination message from mobile station 102, RAN 104, on behalf of mobile station 102, sets up the packet-based communication session between mobile station 102 and endpoint 110. This involves (i) sending to endpoint 110 a first message, which includes an invitation to endpoint 110 to participate in the communication session, and (ii) receiving from endpoint 110 a second message, which includes an indication that endpoint 110 has accepted the invitation.

At step 206, responsive to receiving the second message, RAN 104 sends to mobile station 102 a third message, which includes information enabling mobile station 102 to engage in at least one of (i) messaging with endpoint 110 related to the communication session and (ii) participation in the communication session with endpoint 110.

These steps are further explained in the following subsections.

i. RAN Receives Origination Message from Mobile Station

At step 202, RAN 104 receives an origination message from mobile station 102. This message is shown in the call-flow 300 of FIG. 3 as "Origination Message 302," and includes a code and a called-party identifier. The code could be referred to as a service-option code, and may indicate to RAN 104 that mobile station 102 is requesting that, on behalf of mobile station 102, RAN 104 set up a packet-based communication session between mobile station 102 and endpoint 110, which is associated with the called-party identifier. Note that the code need not be a single number or character string, but could comprise any number of values and data fields.

RAN 104 may receive the origination message from mobile station 102 over a CDMA access channel. Alternatively, RAN 104 may receive the origination message over any radio channel: administrative, traffic, or otherwise. In some embodiments, the origination message could be a packet-data message sent over an established packet-data connection. In other embodiments, the origination message could be a non-packet-data message, akin to requests that mobile stations currently make for voice calls and to initiate data services.

With respect to the called-party identifier that is included in the origination message, that called-party identifier could include one or more of a telephone number, an IP address, a SIP address, a SIP Uniform Resource Identifier (URI), and/or any other identifier or combination of identifiers that identify for RAN 104 an endpoint with which mobile station 102 would like to engage in a packet-data communication session.

That packet-data communication session could be a voice call (such as a VoIP session), an RTP session, and/or any other type of packet-data communication session. Furthermore, as noted above, endpoint 110 could be any one of a mobile station, a packet-based telephony device, a cellular telephone, a PDA, a computer, a server, a gateway, a media gateway connected to the PSTN, a push-to-talk server, a conference server, a group of recipients, and/or any other type of packet-data-communication-session endpoint now known or later developed.

Note that, prior to or as part of carrying out step 202, RAN 104 may establish a packet-data connection with mobile station 102. This may involve establishing a radio link as well as a data-link-layer connection, such as a PPP connection, with mobile station 102, and assigning an IP address to mobile station 102. In some embodiments, RAN 104 may then terminate the radio link but maintain the data-link-layer connection and the IP address, placing mobile station 102 in "dormant" mode. In some embodiments, RAN 104 may, in response to receiving the origination message from mobile station 102, determine that there is currently no radio link between RAN 104 and mobile station 102 and responsively reestablish the radio link, prepping mobile station 102 for the packet-data communication session to come.

ii. RAN Sets Up the Packet-Data Communication Session on Behalf of the Mobile Station At step 204, responsive to receiving the origination message from mobile station 102, RAN 104, on behalf of mobile station 102, sets up the packet-based communication session between mobile station 102 and endpoint 110. While, as mentioned above, the packet-based communication session could be any one of a number of types of packet-based communication session, a VoIP session will be used here as an illustrative example.

For carrying out method 200, RAN 104 may include SIP client 106. As such, step 204 may involve SIP client 106 sending a SIP INVITE message to endpoint 110. This message is shown in FIG. 3 as "SIP INVITE 304," and may include an invitation to endpoint 110 to participate in the VoIP session. Step 204 may further involve SIP client 106 receiving a SIP 200 OK message from endpoint 110. This message is shown in FIG. 3 as "SIP 200 OK 306," and may include an indication that endpoint 110 has accepted the invitation.

Prior to sending the SIP INVITE message, RAN 104, and perhaps specifically SIP client 106, may access one or more databases to facilitate generating the SIP INVITE message and setting up the VoIP session as a general matter. Thus, assuming that the above-referenced called-party identifier is a phone number associated with endpoint 110, SIP client 106 may use this number as a key into one or more databases to access a SIP address and/or IP address associated with endpoint 110. SIP client 106 may also use a telephone number associated with mobile station 102, such as the mobile station's MIN, which may be included in the origination message, to access a SIP address and/or IP address associated with mobile station 102.

Also, as explained above, SIP client 106 may use the mobile station's MIN to access the mobile station's most recent nonce-response pair and/or any other data that would aid SIP client 106 and/or RAN 104 more generally in determining whether a user of mobile station 102 is authorized to initiate the VoIP session. In general, RAN 104, and perhaps specifically SIP client 106, may access one or more databases using one or more values to access one or more parameters to include in at least one message sent from RAN 104.

Note that the SIP INVITE message, the SIP 200 OK message, and/or any other communication-session-setup messages sent or received by RAN 104 may include one or more headers that indicate that mobile station 102 and endpoint 110 are (or will be) the actual participants in the packet-based communication session.

Upon receipt of the SIP 200 OK message from endpoint 110, SIP client 106 may send a SIP ACK message to endpoint 110, acknowledging receipt of the SIP 200 OK message, and perhaps finalizing one or more parameters of the upcoming packet-based communication session. This message is shown in FIG. 3 as "SIP ACK 310." From the perspective of endpoint 110, this may complete the session-setup process, and endpoint 110 may now perceive that it is ready to participate in the VoIP session with mobile station 102, having no idea that SIP client 106 has stepped into the mobile station's shoes to arrange the session on the mobile station's behalf Finally, if this has not been done already, RAN 104 may, in response to receiving the SIP 200 OK message, determine that there is currently no radio link between RAN 104 and mobile station 102, and responsively reestablish the radio link.

iii. RAN Communicates Information Regarding the Established Communication Session to the Mobile Station At step 206, responsive to receiving the SIP 200 OK message from the endpoint, RAN 104 sends a SIP CONNECT message to the mobile station. This message is shown in FIG. 3 as "SIP CONNECT 308," and includes information enabling mobile station 102 to engage in (i) messaging—such as SIP messaging—with endpoint 110 related to the VoIP session and/or (ii) participation in the VoIP session with endpoint 110. Note that any other type of SIP message or any other type of message could be used to carry out this step and, for that matter, any of the steps described herein. The SIP CONNECT message is provided by way of example. Note also that RAN 104 may send the SIP CONNECT message before or after—but preferably before—sending the above-described SIP ACK message to endpoint 110.

As stated above, standard SIP does not include a CONNECT message—that message is newly defined in connection with the present invention. The SIP CONNECT message may take the form of the message of FIG. 4. In particular, FIG. 4 is a simplified block diagram of a message that may be used in accordance with exemplary embodiments. As shown in FIG. 4, the message 400 may include a number of headers, followed by parameters pertaining to the VoIP session arranged by RAN-based SIP client 106 on behalf of mobile station 102.

The first line of message 400 reads "CONNECT SIP/2.0." This indicates that the message is a CONNECT message and that version 2.0 of SIP is being used to arrange the packet-data communication session. The next line reads "To: [ENDPOINT_110_SIP_ADDRESS] [ENDPOINT_110_IP_ADDRESS]." In practice, these identifiers would be replaced by an actual SIP and IP address, respectively. This line indicates that the invitee to the VoIP session is endpoint 110, and includes information that may have been obtained by SIP client 106.

The next line reads "FROM: [MOBILE_STATION_102_SIP_ADDRESS]." Again, in practice, this line would include an actual SIP address—and perhaps an actual IP address—for mobile station 102. This line indicates that the entity making the original invitation regarding the VoIP session was mobile station 102, in spite of the fact that SIP client 106 handled certain aspects of the session initiation, as described herein. SIP client 106 may have previously used the mobile station's MIN to access the mobile station's SIP address.

The next line reads "CONTENT-TYPE: application/SDP." This line indicates that the general payload of message 400 is a set of SDP parameters. As mentioned above, SDP is a protocol used to describe various parameters—codecs, protocols, etc.—of a communication session. Other protocols could be used, however, as SDP is merely an example.

The next line of message 400 reads "CALL-ID: [CALL_IDENTIFIER]." This line provides a unique identifier associated with the VoIP session. Following the "CALL-ID" line is one that reads "CONTENT-LENGTH: [NUMBER_OF_BYTES]." Note that, in practice, this line would contain an integer number representing the number of bytes in the body of message 400, which is the portion that follows the headers. Note also that the lines comprising headers are those with the header name, followed by a colon, followed by a particular value or values for that header. For example, "CALL-ID" is a header name.

The next line reads "APP-ID: [APPLICATION_IDENTIFIER]." In practice, this line would include an identifier that indicates with what application this communication session will be conducted. As an example, this identifier could be "PTT" representing "push-to-talk."

The next two lines of message 400 read "X-TO: ["TO:" PARAMETER USED BY RAN SIP CLIENT]" and "X-FROM: ["FROM:" PARAMETER USED BY RAN SIP CLIENT]."These "X-TO:" and "X-FROM:" headers may, in general, be included in message 400 due to the circumstances of the present invention: namely, that SIP client 106 sets up the communication session on behalf of mobile station 102. These headers could be included in message 400 instead of or in addition to the "TO:" and "FROM:" headers shown in the first two lines.

Note also that these headers need not be named "X-TO:" and "X-FROM:," and that these names are provided by way of example. One possible use for the "X-TO:" and "X-FROM:"

headers was described above: to indicate that mobile station 102 and endpoint 110 would be the actual endpoints of the communication session being arranged. Another possible use is to convey to mobile station 102 in message 400 what values were used in the "TO:" and "FROM:" headers in SIP messages sent earlier in the communication-setup sequence.

Following the headers is the body of message 400. In FIG. 4, the body is represented by the line "[SDP_PARAMETERS]." In practice, the body of message 400 may well be made up of more than one line. Furthermore, division of message 400 into lines may, as a general matter, be a convention used only for display. In actuality, message 400 may be a continuous sequence of bytes, perhaps having demarcating indicators between headers, between the headers and the body, between various values listed in particular headers, and so on. The particular implementations may vary. In any event, in this example, the body of message 400 may comprise one or more SDP parameters pertaining to the VoIP session between mobile station 102 and endpoint 110, as agreed upon between RAN 104 (SIP client 106) and endpoint 110.

Once mobile station 102 has received the SIP CONNECT message from RAN-104-based SIP client 106, mobile station 102 is equipped to exchange packet data with endpoint 110 over a communication path that includes RAN 104 and PDN 108. This packet data may include messages, such as SIP messages, and may instead or in addition include packets making up all or part of the packet-data communication (e.g., VoIP) session.

Thus, mobile station 102 may send to endpoint 110 one or more RTP packets, which may include digitized voice data as part of the VoIP session. Mobile station 102 may also receive such RTP packets from endpoint 110. This exchange is shown in FIG. 3 as "RTP session 312." As an example of SIP messaging that mobile station 102 and endpoint 110 may now participate in directly, mobile station 102 may terminate the VoIP session by sending a SIP BYE message to endpoint 110, which may respond with a SIP 200 OK message. These messages are shown in FIG. 3 as "SIP BYE 314" and "SIP 200 OK 316," respectively. In general, mobile station 102 and endpoint 110 may exchange SIP messages related to initiation, maintenance, termination, teardown, and/or any other aspect of the packet-based communication session.

b. A Second Exemplary Method

Figure 5:
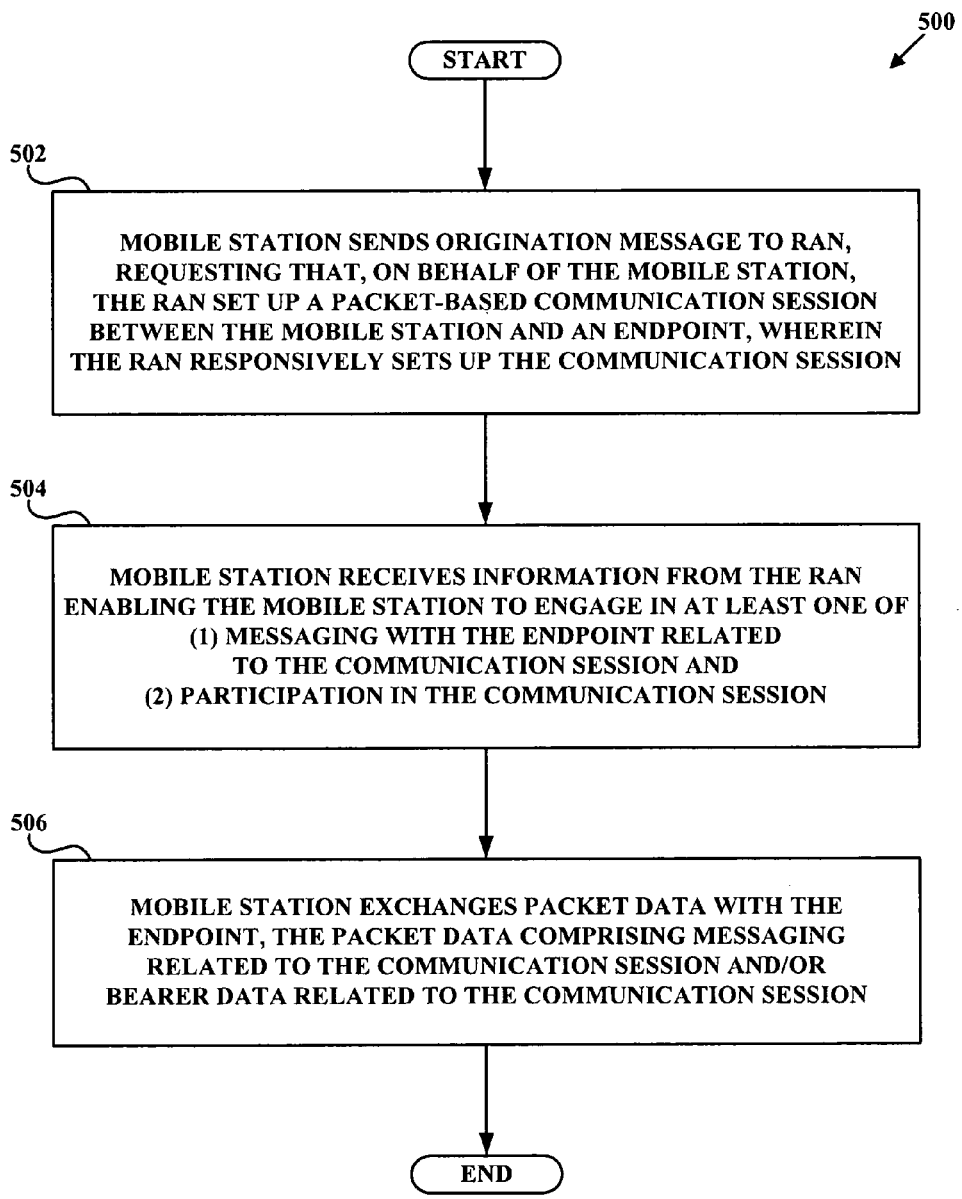
FIG. 5 is a flowchart of a second exemplary method that makes use of the communication system of FIG. 1, in accordance with exemplary embodiments.

FIG. 5 is a flowchart of a second exemplary method that makes use of the communication system of FIG. 1, in accordance with exemplary embodiments. Method 500 is similar in many respects to method 200, and thus will not be described in as much detail.

As shown in FIG. 5, method 500 begins at step 502, when mobile station 102 sends an origination message to RAN 104. This message includes a code and a called-party identifier. The code indicates that mobile station 102 is requesting that, on behalf of mobile station 102, RAN 104 set up a packet-based communication session between mobile station 102 and endpoint 110, which is associated with the called-party identifier. That identifier could, for example, be a telephone number associated with endpoint 110. In response to the origination message, RAN 104 sets up the packet-based communication session on behalf of mobile station 102. To do so, RAN 104 may, as described herein, make use of a RAN-based SIP client such as SIP client 106.

At step 504, mobile station 102 receives a connect message, such as message 400, from RAN 104. The connect message contains information that enables mobile station 102 to engage in messaging with endpoint 110 related to the packet-based communication session and/or participate in the packet-based communication session with endpoint 110.

At step 506, responsive to receiving the connect message from RAN 104, mobile station 102 exchanges packet data with endpoint 110 over a communication path that includes RAN 104 and PDN 108. This packet data includes messaging related to the packet-based communication session and/or bearer data related to the communication session.

4. Conclusion

Various exemplary embodiments have been described above. Those skilled in the art will understand, however, that changes and modifications may be made to those examples without departing from the scope of the claims.

What is claimed is:

1. A method comprising:
   a radio access network (RAN) receiving an origination message over an air interface from a mobile station, the origination message comprising a code and a called-party identifier, the code indicating that the mobile station is requesting that, on behalf of the mobile station, the RAN set up a packet-based communication session between the mobile station and an endpoint associated with the called-party identifier, wherein the origination message does not comprise a Session Initiation Protocol (SIP) message; and
   responsive to receiving the origination message from the mobile station, the RAN, on behalf of the mobile station, using a RAN-based SIP client to set up the packet-based communication session between the mobile station and the endpoint, wherein the RAN-based SIP client (i) generates a first SIP message comprising an invitation to the endpoint to participate in the packet-based communication session, (ii) sends the first SIP message to the endpoint, and (iii) receives a second SIP message from the endpoint, the second SIP message comprising an indication that the endpoint has accepted the invitation, wherein, on behalf of the mobile station, the RAN-based SIP client arranges one or more parameters of the packet-based communication session using at least the first and second SIP messages,
   wherein, responsive to receiving the second SIP message, the RAN-based SIP client sends a third SIP message over the air interface to the mobile station, the third SIP message comprising information enabling the mobile station to engage in at least one of (i) messaging with the endpoint related to the packet-based communication session and (ii) participation in the packet-based communication session with the endpoint, wherein the information comprises the one or more arranged parameters.

2. The method of claim 1, wherein the RAN receiving the origination message from the mobile station comprises the RAN receiving the origination message from the mobile station over at least one of an access channel, an administrative channel, and a traffic channel.

3. The method of claim 1, further comprising the mobile station, subsequent to the RAN-based SIP client sending the third SIP message to the mobile station, engaging in messaging with the endpoint related to the packet-based communication session over a communication path comprising the RAN and a packet-data network.

4. The method of claim 3, wherein the messaging is SIP messaging.

5. The method of claim 3, wherein the messaging is related to at least one of maintenance of the packet-based communication session, termination of the packet-based communication session, and teardown of the packet-based communication session.

6. The method of claim 1, further comprising the mobile station using the one or more arranged parameters for participating in the packet-based communication session with the endpoint over a communication path comprising the RAN and a packet-data network.

7. The method of claim 6, wherein the mobile station participating in the packet-based communication session with the endpoint comprises the mobile station exchanging Real-time Transport Protocol (RTP) packets with the endpoint.

8. The method of claim 1, further comprising the RAN establishing a packet-data connection with the mobile station.

9. The method of claim 8, wherein establishing a packet-data connection with the mobile station comprises:
establishing a radio link with the mobile station;
establishing a data-link-layer connection with the mobile station; and
assigning an Internet Protocol (IP) address to the mobile station.

10. The method of claim 9, further comprising:
the RAN terminating the radio link but maintaining the data-link-layer connection and the IP address; and
responsive to at least one of receiving the origination message and receiving the second SIP message, the RAN determining that there is no radio link between the RAN and the mobile station, and responsively reestablishing the radio link.

11. The method of claim 1, wherein the called-party identifier comprises at least one of a telephone number and an Internet Protocol (IP) address.

12. The method of claim 1, wherein the first SIP message is a SIP INVITE message.

13. The method of claim 1, wherein the second SIP message is a SIP 200 OK message, wherein the RAN-based SIP client sends a SIP ACK message to the endpoint in response to receiving the SIP 200 OK message.

14. The method of claim 1, wherein the third SIP message is a SIP CONNECT message.

15. The method of claim 1, wherein at least one of the first, second, and third SIP messages comprises at least one header indicating that the mobile station and the endpoint are participants in the packet-based communication session.

16. The method of claim 1, wherein the packet-based communication session comprises at least one of a voice call, a Voice over Internet Protocol (VoIP) session, and a Real-time Transport Protocol (RTP) session.

17. The method of claim 1, further comprising the RAN accessing at least one database to obtain at least one of a SIP address associated with the mobile station, a SIP address associated with the endpoint, an Internet Protocol (IP) address associated with the mobile station, an IP address associated with the endpoint, a nonce, a response to a nonce, data that indicates whether a user of the mobile station is authorized to initiate the packet-based communication session, and a parameter to include in at least one message sent from the RAN.

18. The method of claim 1, wherein the endpoint is at least one of a second mobile station, a packet-based telephony device, a cellular telephone, a personal digital assistant (PDA), a computer, a server, a gateway, a media gateway connected to a Public Switched Telephone Network (PSTN), a push-to-talk server, a conference server, and a group of recipients.

19. A radio access network (RAN) comprising:
a processor; and
a memory comprising instructions executable by the processor to:
receive an origination message over an air interface from a mobile station, the origination message comprising a code and a called-party identifier, the code indicating that the mobile station is requesting that, on behalf of the mobile station, the RAN set up a packet-based communication session between the mobile station and an endpoint associated with the called-party identifier, wherein the origination message does not comprise a Session Initiation Protocol (SIP) message; and
responsive to receiving the origination message from the mobile station, use a RAN-based SIP client to, on behalf of the mobile station, set up the packet-based communication session between the mobile station and the endpoint, wherein the RAN-based SIP client (i) generates a first SIP message comprising an invitation to the endpoint to participate in the packet-based communication session, (ii) sends the first SIP message to the endpoint, and (iii) receives a second SIP message from the endpoint, the second SIP message comprising an indication that the endpoint has accepted the invitation, wherein, on behalf of the mobile station, the RAN-based SIP client arranges one or more parameters of the packet-based communication session using at least the first and second SIP messages,
wherein, responsive to receiving the second SIP message, the RAN-based SIP client sends a third SIP message over the air interface to the mobile station, the third SIP message comprising information enabling the mobile station to engage in at least one of (i) messaging with the endpoint related to the packet-based communication session and (ii) participation in the packet-based communication session with the endpoint, wherein the information comprises the one or more arranged parameters.

* * * * *

UNITED STATES PATENT AND TRADEMARK OFFICE
CERTIFICATE OF CORRECTION

| | | |
|---|---|---|
| PATENT NO. | : 8,144,644 B1 | Page 1 of 1 |
| APPLICATION NO. | : 11/348644 | |
| DATED | : March 27, 2012 | |
| INVENTOR(S) | : David Mohan et al. | |

It is certified that error appears in the above-identified patent and that said Letters Patent is hereby corrected as shown below:

Title page, at item [75], delete "Timothy W. Sill, Platte City, MI" and add -- Timothy W. Sill, Platte City, MO --

Signed and Sealed this
Twenty-ninth Day of May, 2012

David J. Kappos
*Director of the United States Patent and Trademark Office*